(12) United States Patent
Hayami (10) Patent No.: US 7,057,504 B2
(45) Date of Patent: Jun. 6, 2006

(54) VEHICLE HEADLAMP APPARATUS

(75) Inventor: Toshihisa Hayami, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 76 days.

(21) Appl. No.: 10/697,524

(22) Filed: Oct. 30, 2003

(65) Prior Publication Data
US 2004/0085780 A1 May 6, 2004

(30) Foreign Application Priority Data
Nov. 5, 2002 (JP) ............ P. 2002-320602

(51) Int. Cl.
*B60Q 11/00* (2006.01)

(52) U.S. Cl. ............ 340/458; 340/686.1; 340/686.3; 362/464; 362/465; 362/466; 362/467; 362/525; 362/526

(58) Field of Classification Search ............ 340/458, 340/686.1, 686.3; 362/464–467, 525, 523, 362/526, 527, 271, 272, 276, 286, 646
See application file for complete search history.

(56) References Cited

U.S. PATENT DOCUMENTS

| | | | |
|---|---|---|---|
| 5,511,161 A | * | 4/1996 | Sato et al. ............ 714/23 |
| 6,305,823 B1 | * | 10/2001 | Toda et al. ............ 362/276 |
| 6,325,528 B1 | * | 12/2001 | Wittmeier et al. ............ 362/514 |
| 6,411,872 B1 | * | 6/2002 | Fujita et al. ............ 701/29 |
| 6,676,283 B1 | * | 1/2004 | Ozawa et al. ............ 362/547 |
| 6,729,749 B1 | * | 5/2004 | Kondo et al. ............ 362/466 |
| 2002/0064051 A1 | | 5/2002 | Sugimoto et al. |
| 2002/0075691 A1 | * | 6/2002 | Couillaud et al. ............ 362/465 |

FOREIGN PATENT DOCUMENTS

| JP | 405007690 A | * | 1/1993 |
|---|---|---|---|
| JP | 2002-160581 | | 6/2002 |

* cited by examiner

*Primary Examiner*—Tai T. Nguyen (74) *Attorney, Agent, or Firm*—Fish & Richardson P.C.

(57) ABSTRACT

In a headlamp apparatus comprising a sub-CPU integrally provided on a headlamp for controlling an optical axis direction changing operation and a main CPU for sending out to the sub-control circuit a control signal for changing the direction of the optical axis, the sub-CPU comprises a power-on resetting circuit of a simple configuration comprising a capacitor and a resistor. When the main CPU detects an abnormality in the sub-CPU, a power supply is temporarily cut off by a power supply control means, and the sub-CPU is reset by a power-on resetting circuit. An abnormality triggered by a runaway of the sub-CPU can be resolved so that the sub-CPU can be restored to a normal condition as quickly as possible.

8 Claims, 11 Drawing Sheets

VEHICLE HEADLAMP APPARATUS

BACKGROUND OF THE INVENTION

The present invention relates to a headlamp apparatus for vehicles such as automobiles for changing the direction of the light-emitting optical axis of a headlamp by making use of a motor as a drive source, and more particularly to a vehicle headlamp apparatus preferred for use for a headlamp apparatus comprising a light distribution control means, such as the Adaptive Front-lighting System (hereinafter, referred to as AFS), for changing the illuminating direction and range of the headlamp to follow the diving direction of a vehicle.

Figure 1:
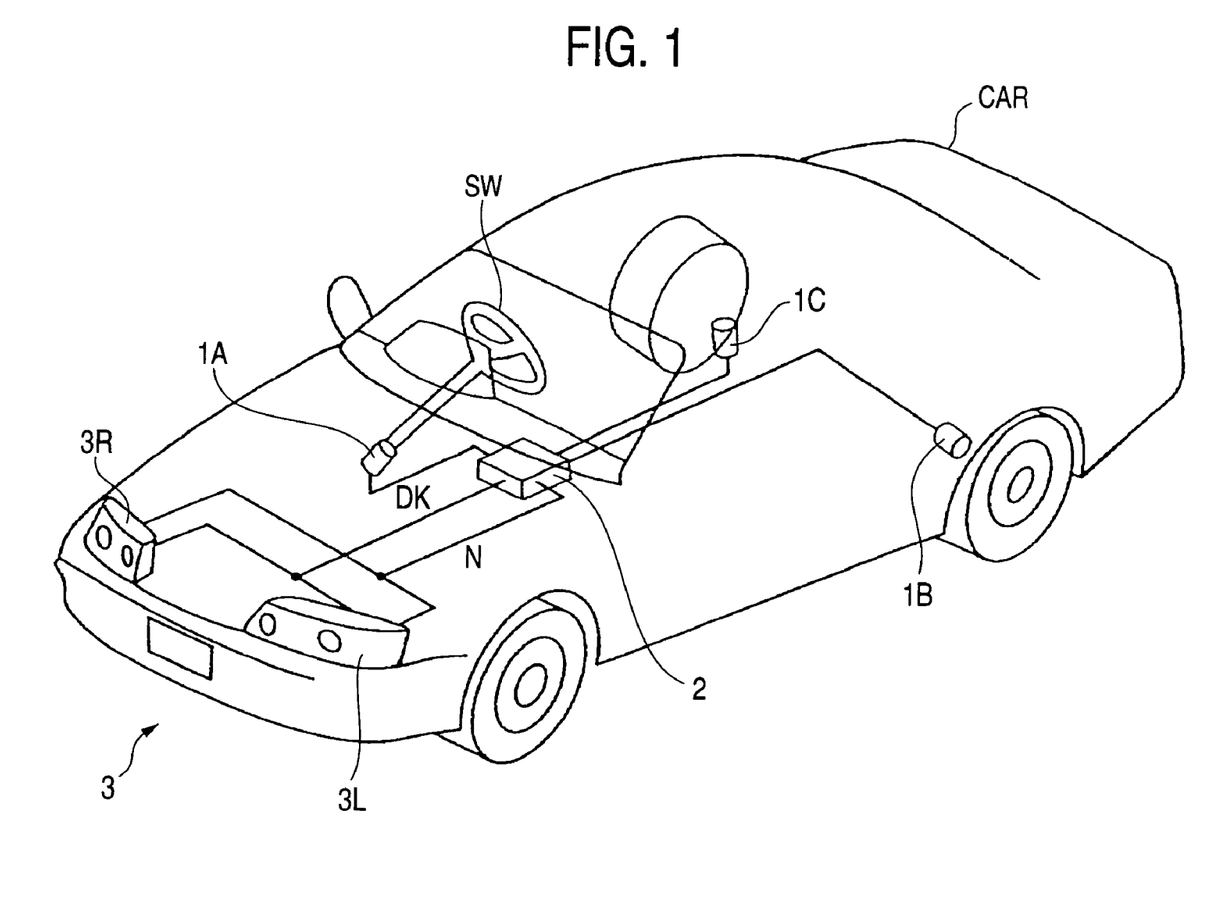
FIG. 1 is a drawing illustrating the concept of an AFS.

As an AFS that has been proposed to enhance the driving safety of automobiles, U.S. Published Patent Application 2002-0064051 A1 (published on May 30, 2002) describes a technology proposed by the inventor of this invention. As the concept of the technology is briefly shown in FIG. 1, in this AFS, information indicating the driving conditions of an automobile CAR is detected by a sensor 1, and what has been detected is outputted to an electronic control unit (hereinafter, referred to as ECU). As the sensor 1, there are provided, for example, a steering angle sensor 1A for detecting an angle through which a steering wheel SW of the automobile CAR is steered, a vehicle speed sensor 1B for detecting the vehicle speed of the automobile CAR and vehicle height sensors 1C for detecting the respective heights of front and rear axles to detect the horizontality (level) of the automobile CAR (only a sensor for a rear axle is shown in FIG. 1), these sensors 1A, 1B and 1C being connected to the ECU. The ECU 2 controls swivel lamps 3R, 3L or headlamps 3 equipped at the front of the automobile on the right- and left-hand sides thereof, respectively, which are adapted for changing their light distributions by controlling the side-to-side change of the illuminating direction of light based on outputs from the respective sensors 1. As the swivel lamps 3R, 3L, there is provided, for example, a headlamp in which a reflector and a projector lamp that are provided in the headlamp are constructed so as to rotate or swivel in horizontal directions and which comprises a rotationally driving means for rotationally driving the reflector and the projector lamp by means of a drive source such as a driving motor. The mechanism including the rotationally driving means is referred to as an actuator herein. According to the AFS of this type, when the automobile is driven on a curved road, the road surface ahead of a curve on the curved road can be illuminated according to the driving speed of the automobile, and thus, the AFS is effective when attempting to enhance the driving safety of the automobile.

When there occurs in this AFS a defect that the direction of the optical axis of the headlamp cannot be changed properly, that is, when there occurs a defect that the illuminating direction of the headlamp cannot be controlled with the illuminating direction of the headlamp being kept shifted either leftward or rightward relative to the straight-ahead running direction of the automobile, the foreground of the automobile cannot be illuminated when the automobile drives straight ahead or takes a turn at an opposite bend to the direction in which the reflector and the projector lamp are kept shifted, whereby the driving safety is deteriorated. Alternatively, when there occurs a defect that the illuminating direction continues to change side to side, there may be caused a risk that drivers of oncoming vehicles and/or vehicles in the vicinity of the subject vehicle are dazzled and are then put to dangerous conditions. While the following cases are considered as reasons for triggering the defects: there occurs a certain defect in the sensors 1, and no outputs from the sensors 1 cannot be inputted into the ECU 2; there occurs a certain defect in the ECU 2; and there occurs a certain defect in the actuators of the respective swivel lamps 3R, 3L, most of the defects are triggered when a main control circuit such as a microcomputer incorporated in the ECU 2 or sub-control circuits integrally provided on the actuators of the respective swivel lamps 3R, 3L runs away.

When the AFS fails due to the runaway of the main control circuit or the sub-control circuits, since the normal condition can be restored from the failing condition immediately the control circuits are reset, it is considered that a reset circuit is provided on the main control circuit and/or the sub-control circuits. In particular, in case an automatic reset circuit is provided for automatically implementing an automatic reset operation based on a signal which has detected a defect, the control circuit can be reset immediately the defect occurs so as to be recovered from the problematic condition. Since the main control circuit having the ECU 2 can be placed at an appropriate position on the vehicle, as shown in FIG. 1, and there is little limitation imposed on the external size and capacity of the ECU 2, it is relatively easy to incorporate the automatic reset circuit in the main control circuit. However, since the actuator having the sub-control circuit needs to be incorporated in the swivel lamp 3R, 3L, the external configuration and capacity of the actuator are subjected to a certain restriction, and therefore, it is difficult to provide the automatic reset circuit that is provided on the main control circuit on the sub-control circuit. Due to this, once a defect occurs, it becomes difficult to get recovered from a problematic condition quickly by automatically resetting the sub-control circuit.

SUMMARY OF THE INVENTION

An object of the invention is to provide a vehicle headlamp apparatus which enables an automatic reset of the sub-control circuit only by providing a simple power-on resetting circuit on the sub-control circuit so that the AFS can get recovered from a problematic condition as quickly as possible.

According to an aspect of the invention, there is proposed a vehicle headlamp apparatus having an optical axis direction changing means for changing the direction of a light-emitting optical axis of a headlamp of a vehicle, the vehicle headlamp apparatus comprising a sub-control circuit provided integrally on the headlamp for controlling the optical axis direction changing means and a main control circuit for sending out to the sub-control circuit a control signal for changing the direction of the optical axis of the headlamp, wherein the sub-control circuit comprises, in turn, a power-on resetting circuit for implementing a reset by switching on and off a power supply, and wherein the main control circuit comprises, in turn, a power supply control means for temporarily cutting off the supply of power to the sub-control circuit when the main control circuit detects an abnormality of the sub-control circuit. In addition, the main control circuit makes the power supply control means to continue to maintain the power supply cut off state when the main control circuit detects an abnormality in the sub-control circuit again after the power supply control means has been activated.

In the invention, the main control circuit sends out a request-a-reply signal to the sub-control circuit and activates the power supply control means when no appropriate reply signal to the request-a-reply signal is sent back from the sub-control circuit. Alternatively, the main control circuit activates the power supply control means when a reply signal is sent thereto from the sub-control circuit to which no request-a-reply signal has been sent out therefrom.

According to the invention, with the power-on resetting circuit of a simple construction comprising a capacitor and a resistor being provided on the sub-control circuit, when the main control circuit detects an abnormality in the sub-control circuit, in the event that the supply of power to the sub-control circuit is cut off once by the power supply control means, the sub-control circuit can be reset by the power-on resetting circuit, so that the abnormality triggered due to the runaway of the sub-control circuit can be resolved, and the AFS is allowed to get recovered as quickly as possible from a problematic condition triggered by the abnormality of the sub-control circuit.

DETAILED DESCRIPTION OF THE PREFERRED EMBODIMENTS

Figure 2:
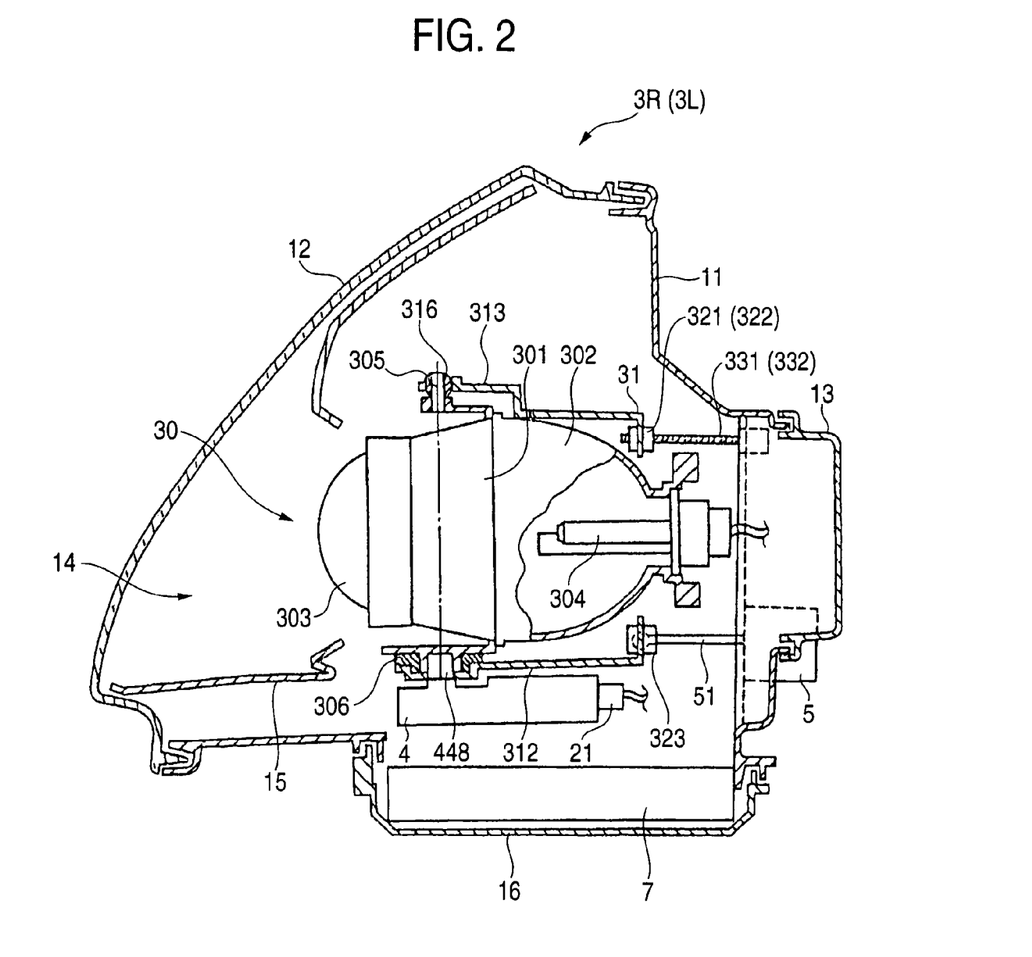
FIG. 2 is a vertical sectional view of a swivel lamp.
Figure 3:
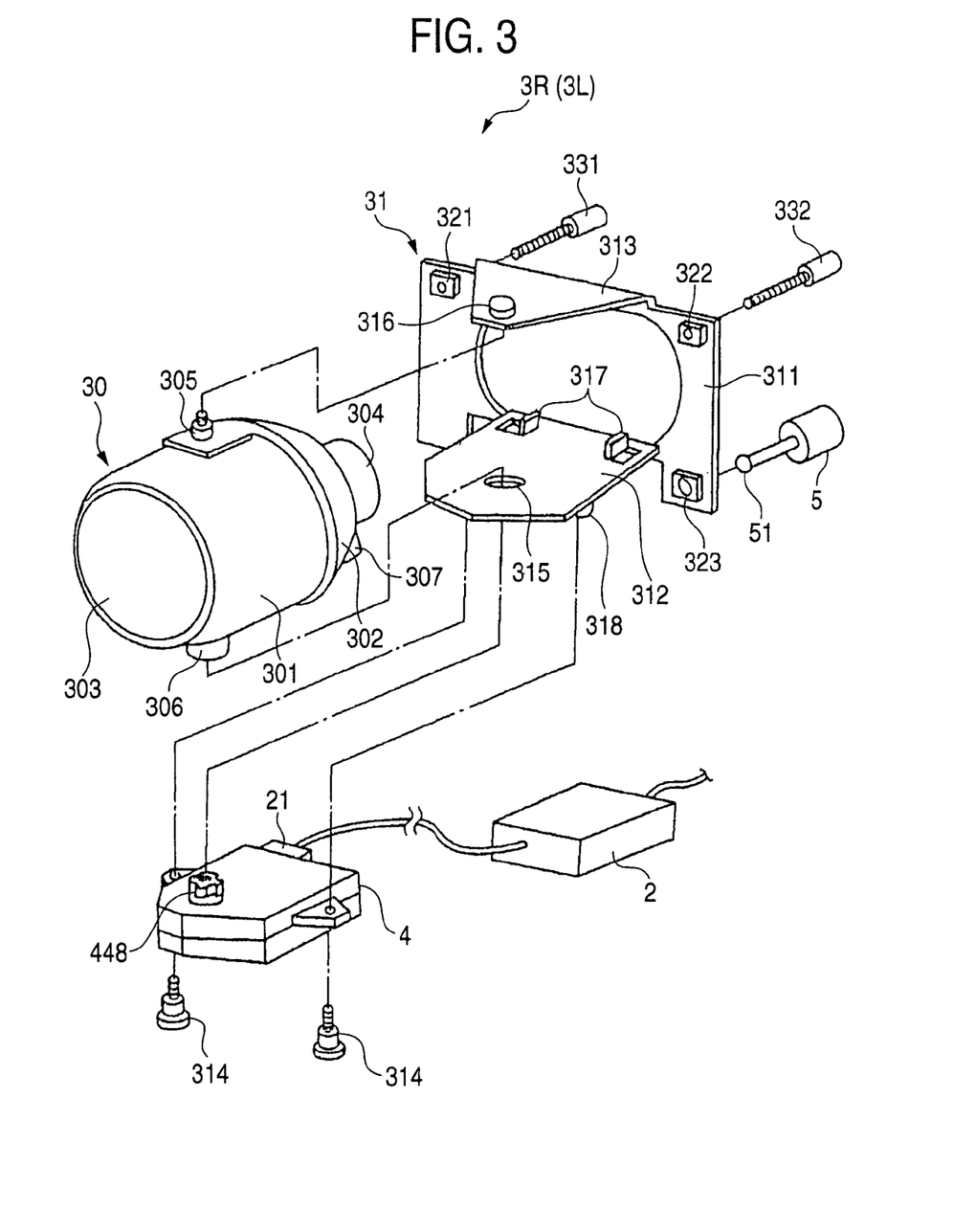
FIG. 3 is an exploded perspective view of a main part of an internal construction of the swivel lamp.

Next, an embodiment of the invention will be described by reference to the accompanying drawings. FIG. 2 is a vertical view of an internal construction of a headlamp comprising, among the constituent elements of the AFS shown as a lamp angle change control means in FIG. 1, the swivel lamp which can change the illuminating direction thereof side to side, and FIG. 3 is a partially exploded perspective view of a main part of the swivel lamp. A lens 12 is mounted in a front opening and a rear cover 13 is mounted in a rear opening in a lamp body 11, respectively, whereby a lamp chamber 14 is formed, and a projector lamp 30 is disposed in the lamp chamber 14. The projector lamp 30 includes a sleeve 301, a reflector 302, a lens 303 and a light source 304 which are integrated into a single unit, and since the project lamp so constructed has already been in wide use, a detailed description thereof will be omitted here only with a single remark that a light source employing a discharge bulb is used for the light source 304. The projector lamp 30 is supported on a substantially U-shaped bracket 31. In addition, an extension 15 is disposed around the periphery of the projector lamp 30 in the lamp body 11 so that the interior of the lamp body 11 is not exposed to the outside through the lens 12. Furthermore, in this embodiment, a bottom cover mounted in a bottom opening in the lamp body 11 is utilized in installing therein an illuminating circuit 7 for illuminating the discharge bulb of the projector lamp 30.

The projector lamp 30 is supported in a state in which the projector lamp 30 is held between a lower plate 312 and an upper plate 313 which are both formed by being bent substantially at right angles from a vertical plate 311 of the bracket 31. An actuator 4, which will be described later on, is fixed to a lower side of the lower plate 312 with screws, and a rotational output shaft 448 of the actuator 4 protrudes upwardly through a shaft hole 315 opened in the lower plate 312. The screws 314 are fixedly screwed into bosses 318 provided on the lower side of the lower plate 312 in such a manner as to protrude therefrom. Then, a shaft portion 305 provided on an upper surface of the projector lamp 30 is fitted in a bearing portion 316 provided on the upper plate 313, and a connecting portion 306 provided on a lower surface of the projector lamp 30 is fitted on the rotational output shaft 448 of the actuator 4 for connection, whereby the projector lamp 30 is allowed to rotate in leftward and rightward directions relative to the bracket 31, and, as will be described later on, is designed to be operated to rotate in horizontal directions together with the rotational output shaft 448 as the actuator 4 operates.

Here, as viewed from the front, aiming nuts 321, 322 are integrally mounted on the bracket 31 at top left- and right-hand side corner portions thereof, and a leveling bearing portion 323 is integrally mounted on a bottom right-hand side corner portion, so that a horizontal aiming screw 331 and a vertical aiming screw 332 which are rotatably supported on the lamp body 11 are screwed into the aiming nuts 321, 322, respectively, and a leveling pole 51 of a living mechanism 5 is fitted in the leveling bearing portion 323. Then, by operating the horizontal aiming screw 331 and the vertical aiming screw 332 to rotate, the bracket 31 is allowed to rotate horizontally and vertically. In addition, by moving the leveling pole 51 axially back and forth by the leveling mechanism 5, the bracket 31 is allowed to rotate vertically. Thus, an aiming adjustment and a leveling adjustment are enabled through these operations, the aiming adjustment being intended to adjust the optical axis of the projector lamp 30 horizontally and vertically and a leveling adjustment to adjust the, optical axis of the projector lamp 30 vertically according to the leveling conditions of a vehicle which change in association with a change in vehicle height. In addition, a projection 307 is provided on a lower side of the reflector 302 of the projector lamp 30 in such a manner as to protrude therefrom, and a pair of stoppers are cut and erected from the lower plate 312 of the bracket 31 at left- and right-hand side positions thereon which correspond to the projection so provided, so that the rotational range of the projector lamp 30 is restricted when the projection 307 is brought into collision contact with either of the stoppers 317 as the projector lamp 30 rotates.

Figure 4:
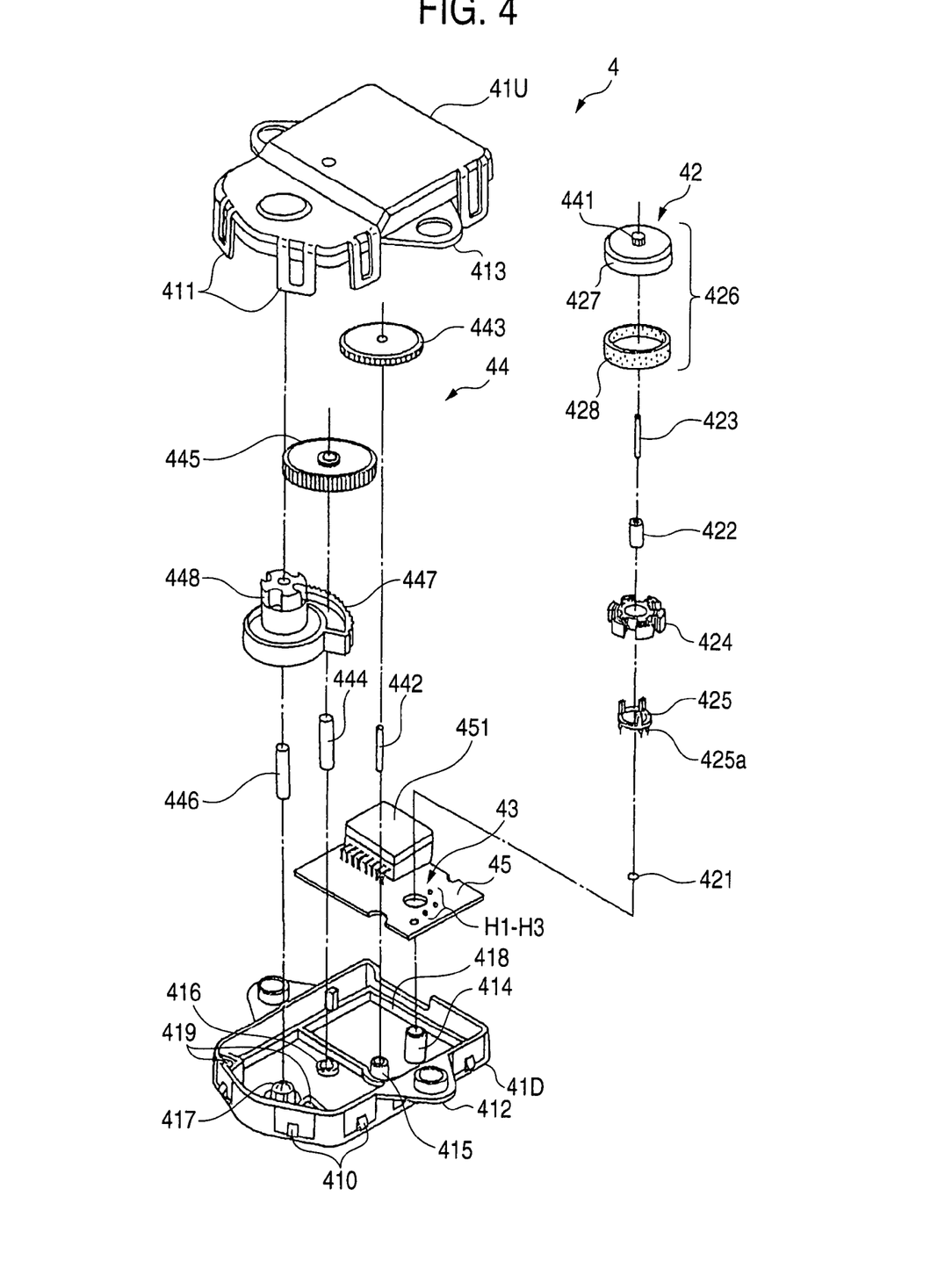
FIG. 4 is a partial exploded perspective view of the actuator.
Figure 5:
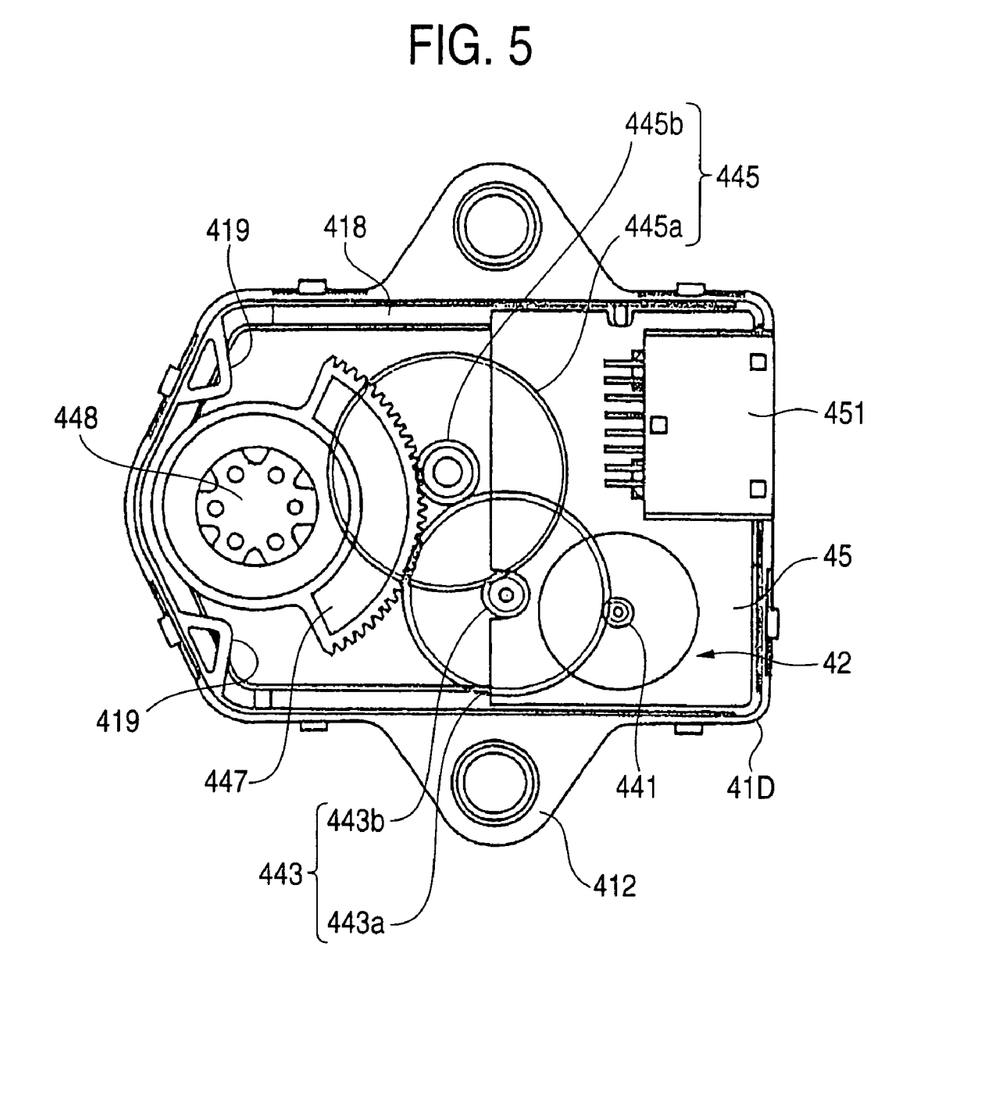
FIG. 5 is a plan view illustrating the construction of the actuator.
Figure 6:
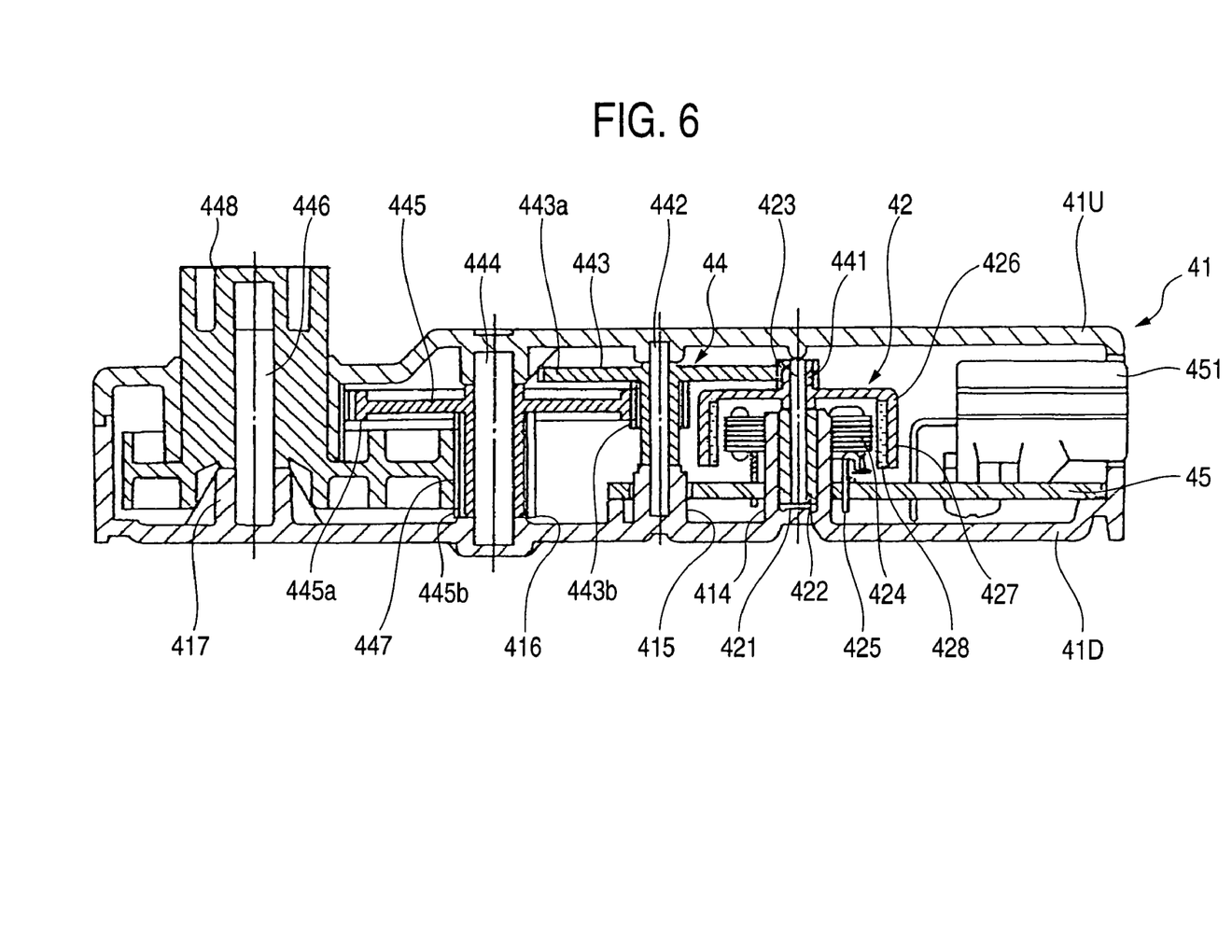
FIG. 6 is a longitudinal sectional view of the actuator.

FIG. 4 is an exploded perspective view of a main part of the actuator 4 for swiveling the swivel lamp 3R, 3L, FIG. 5 is a plan view showing the construction of the actuator assembled together, and FIG. 6 is a longitudinal sectional view of the assembled actuator. A case 41 is made up of an upper half 41U and a lower half 41D which are each formed into a substantially pentagonal disc-like shape, and when a plurality of projections 410 provided on a circumferential surface of the lower half 41D in such a manner as to protrude therefrom and a plurality of fitting pieces 411 provided on a circumferential surface of the upper half 41U in such a manner as to suspend downwardly therefrom are brought into fit engagement with each other, a case chamber is formed inside the upper half 41U and the lower half 41D so fitted together. In addition, supporting pieces 412, 413 are formed on sides of the upper half 41U and the lower half 41D in such a manner as to protrude horizontally outwardly therefrom for use in fixing the case 41 to the bracket 31 by screwing the screws 314 into the bosses 318 on the bracket 31 through the supporting pieces 412, 413 as has been described before. In addition, the splined rotational shaft 448 is caused to protrude from an upper surface of the case 41 for connection to the connecting portion 306 formed on the bottom surface of the projector lamp 30. Additionally, a connector 451 is disposed on a back of the case 41 so that an external connector 21 (refer to FIG. 2) which is connected to the ECU 2 is designed to be connected thereto.

Four hollow bosses 414, 415, 416, 417 are provided on an inner bottom surface of the case 41 at predetermined positions in such a manner as to erect therefrom, and a brushless motor 42, which will be described later on, is assembled onto the first hollow boss 414 as a drive motor. In addition, as will be described later on, respective shafts of a gear mechanism 44 are inserted into the second to fourth hollow bosses 415, 516, 417 to be supported therein. Additionally, a printed circuit board 45 is placed on a staged rib 418 formed along a circumferential edge of the inner bottom surface of the lower half 41D and is installed to be supported within the case 41 while being held between the upper half 41U and the lower half 41D. The brushless motor 42 is electrically connected to this printed circuit board 45, and various types of electronic components, not shown, which function as part of a control circuit 43, which will be described later on, and the connector 451 are installed on the printed circuit board 45.

As shown in FIG. 6, the brushless motor 42 is constructed such that a stator coil 424 including three pairs of coils which are disposed at regular intervals in a circumferential direction is fixedly supported on the first hollow boss 414 on the lower half 41D and is then electrically connected to the printed circuit board 45 so as to be fed. In addition, a cylindrical container-like rotor 426 is fixedly mounted on an upper end portion of a rotational shaft 423 which is rotatably supported on the first hollow boss 414 by a thrust bearing 421 and a sleeve bearing 422 in such a manner as to cover the stator coil 424. This rotor 426 includes a cylindrical container-like yoke 427 formed from a resin and an annular rotor magnet 428 which is fixedly mounted on an inner circumferential surface of the yoke 427 and which is magnetized in such a manner that S and N poles alternate in a circumferential.

The brushless motor 42 constructed as has been described above is designed to change the direction of a magnetic force between the stator coil 424 and the rotor magnet 428 by supplying alternating currents having U, V and W phases which are different from one another to thereby drive to rotate the rotor 426 and the rotational shaft 423. Furthermore, as shown in FIG. 7, three Hall elements H1, H2, H3 are arranged and supported on the printed circuit board 45 at predetermined angular intervals in a circumferential direction of the rotor 426, and when the rotor magnet 428 is rotated together with the rotor 426, magnetic fields in the respective Hall elements H1, H2, H3 are changed, and on and off conditions of the respective Hall elements H1, H2, H3 are then changed, whereby a pulse signal is designed to be outputted in which an H level and an L level are changed periodically in response to the rotational cycle of the rotor 426.

A first gear wheel 441 is integrally formed on the yoke 427 of the rotor 426 from a resin, and this first gear wheel 441 constitutes part of the gear mechanism 44. The gear mechanism 44 transmits the rotational force of the first gear wheel 441, while sequentially decelerating it, to a second large-diameter gear wheel 443a and a second small-diameter gear wheel 443b of a second gear wheel 443 rotatably supported on a first stationary shaft 442, a third large-diameter gear wheel 445a and a small-diameter gear wheel 445b of a third gear wheel 445 rotatably supported on a stationary shaft 444 and a sector gear wheel 447 integrally formed on the rotational output shaft 448 and which is rotatably supported on a third stationary shaft 446. In addition, stoppers 419 are formed on the inner bottom surface of the lower half 41D at positions thereon corresponding to both ends of rotational directions of the sector gear wheel 447 in such a manner as to protrude therefrom for collision contact with respective end portions of the sector gear wheel 447 so as to restrict the total rotational angle range of the sector gear wheel 447 or the rotational output shaft 448. Note that the total rotational angle range of the sector gear wheel 447 is set to become slightly larger than the total rotational angle range of the projector lamp 30 that is restricted by the projection 307 and the stoppers 317.

Figure 7:
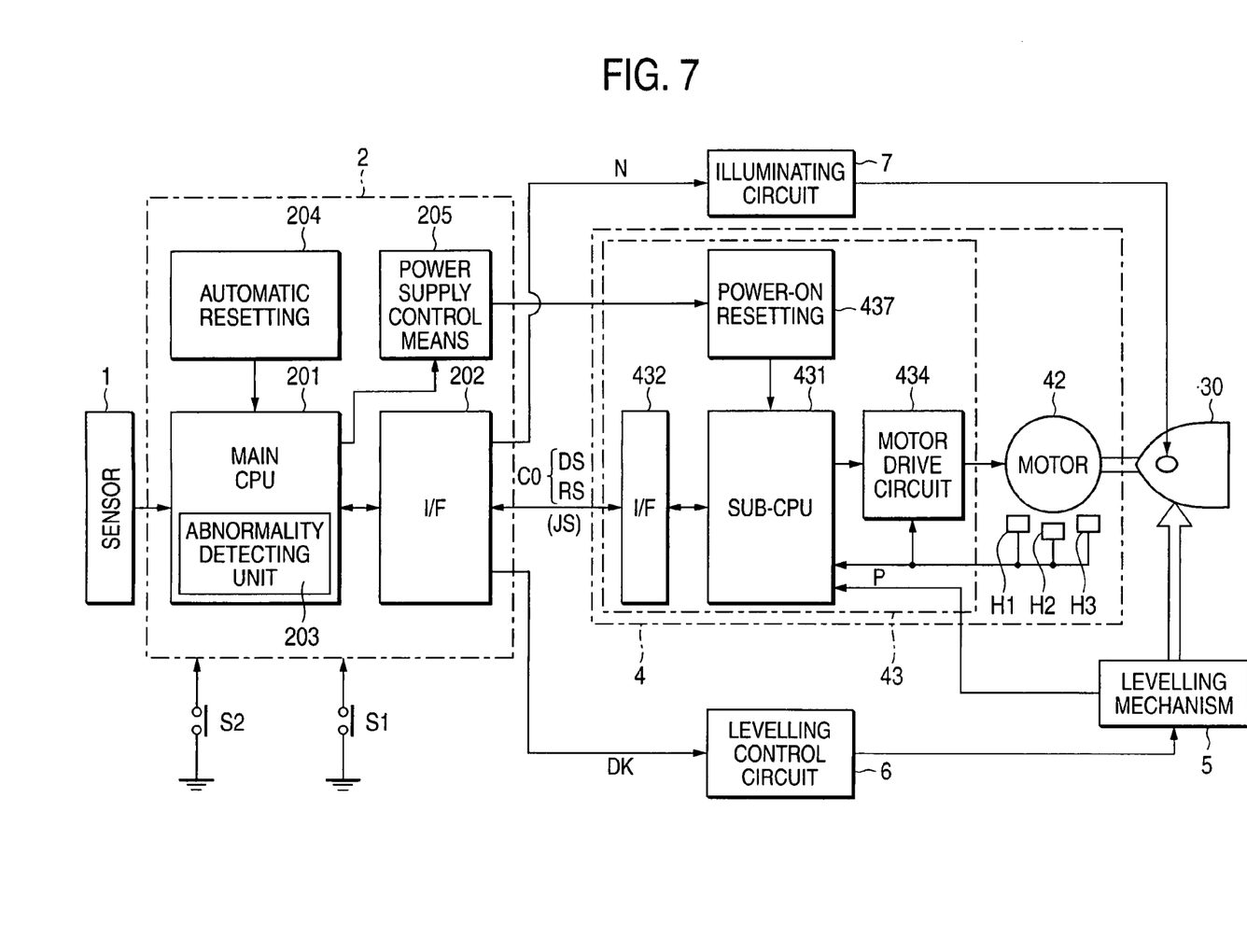
FIG. 7 is a block diagram illustrating a circuit configuration of the AFS.

FIG. 7 is a block diagram showing an electric circuit configuration of an illumination system including the ECU 2 and the actuator 4. Note that the actuator 4 is installed in each of the left and right swivel lamps 3R, 3L of the automobile and is allowed to communicate with the ECU 2 bilaterally. The ECU 2 includes a main CPU 201 as a main control circuit for implementing a process with a predetermined algorithm based on information from the sensors 1 so as to output a required control signal C0 and an interface (hereinafter, referred to as I/F) circuit 202 for inputting and outputting the control signal C0 between the main CPU 201 and the actuator 4. As will be described later on, here, the control signal C0 has a left and right direction change angle signal DS indicating optical axes direction change angles of the swivel lamps 3R, 3L which is sent to the actuators 4 and a request-a-replay signal RS for detecting a defect. The main CPU 201 has there in an abnormality detecting unit 203 for detecting a defect using a programmed software and, as will be described later on, detects a defect according to a reply condition from a sub-CPU 431. In addition, an automatic reset circuit 204 is additionally provided in the main CPU 201 so that the main CPU 201 can automatically be reset. Furthermore, a power supply control circuit 205 is provided in the ECU 2, so that power supplied to the actuator 4 can be cut off temporarily or continuously through the control by the main CPU 201. In addition, on and off signals from a lighting switch S1 provided on the automobile can be inputted into the ECU 2, so that the swivel lamp 3R, 3L can be switched between on and off by controlling based on the on and off of the lighting switch S1 the illuminating circuit 7 for supplying power to the discharge bulb 304 of the projector lamp 30 when connected to an on-board power supply, not shown, by a control signal N. Additionally, the main CPU 201 controls by a leveling signal DK a leveling control circuit 6 for controlling the leveling mechanism 5 for vertically adjusting the optical axis of the bracket 31 which supports the projector lamp 30, so that the optical axis of the projector lamp 30 can be adjusted as the height of the automobile changes. Note that it goes without saying that connections of these electric circuits to the power supply are switched on and off by an ignition switch S2 for switching on and off electric systems provided on the automobile.

The sub-control circuit 43 configured on the printed circuit board 45 installed within the actuator 4 provided in each of the swivel lamps 3R, 3L includes an I/F circuit 432 for inputting and outputting signals from and to the ECU 2, a sub-CPU 431 for implementing a process with a predetermined algorithm based on a signal inputted from the I/F circuit 432 and pulse signals P outputted from the Hall elements H1, H2, H3 and a motor drive circuit 434 for rotationally driving the brushless motor 42 which functions as a rotationally driving means. A power-on resetting circuit 437 to which an onboard power supply is supplied via the power supply control circuit 205 of the ECU 2 is additionally provided in the sub-CPU 431, so that the sub-CPU 431 is reset when the power supply to the power-on resetting circuit 437 is cut off. Although not shown, since it can be made up of a capacitor and a resistor, the power-on resetting circuit is, in reality, integrally assembled onto the printed circuit board 45 which configures the sub-control circuit 43. In addition, the sub-CPU 431 is configured so as to send out to the ECU 2 an operating condition signal JS which indicates the operating condition of the sub-CPU 431.

Figure 8:
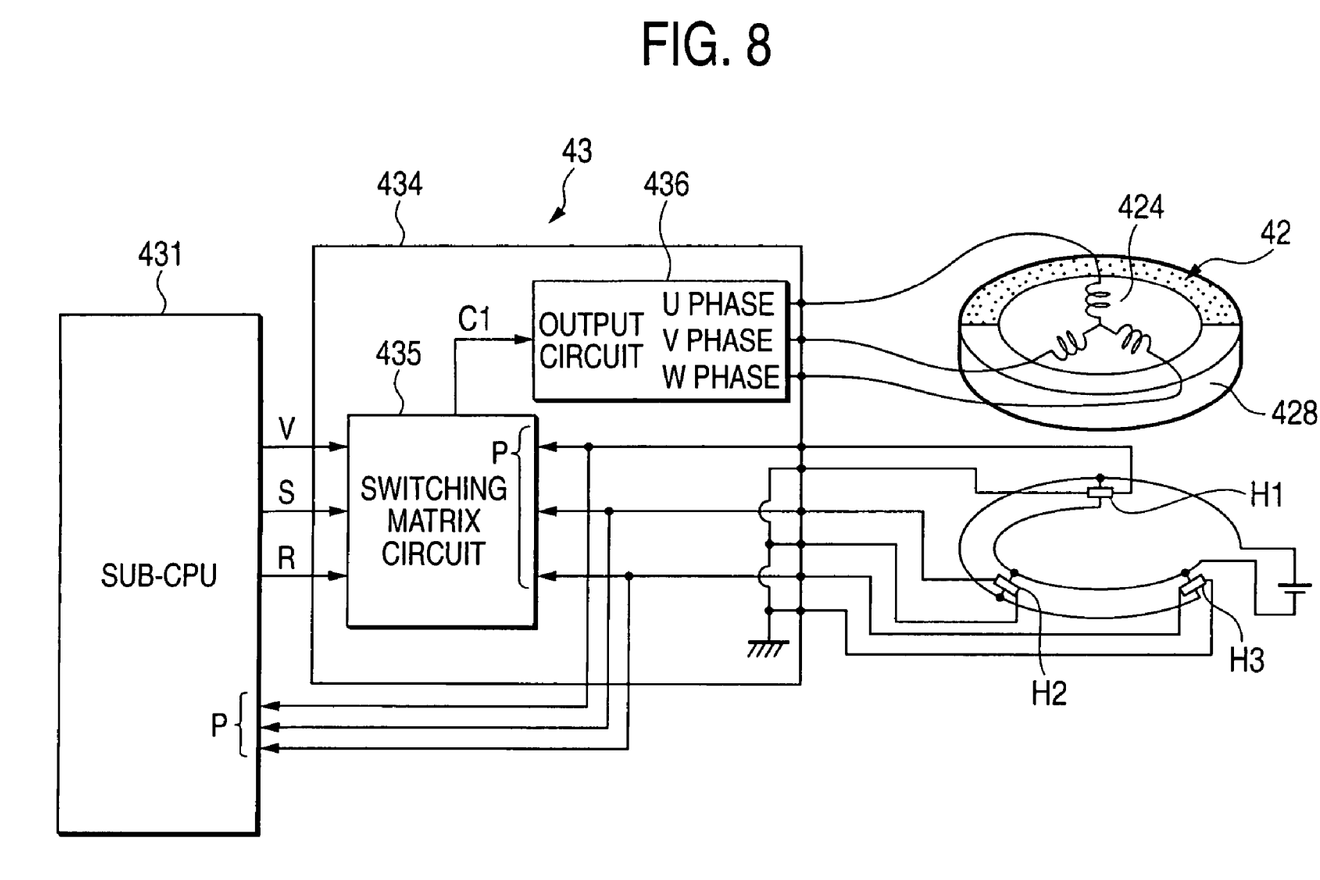
FIG. 8 is a circuit diagram illustrating the circuit configuration of the actuator.

FIG. 8 is a circuit diagram typically showing the motor drive circuit 434 of the control circuit 43 and the brushless motor 42 in the actuator 4. The motor drive circuit 434 includes a switching matrix circuit 435 to which a speed control signal V, start/stop signal S, forward rotation/backward rotation signal Rare inputted from the sub-CPU 431 of the control circuit 43 as control signals and pulse signals are inputted from the three Hall elements H1, H2, H3, and an output circuit 436 for adjusting phases of powers in three phases (U phase, V phase, W phase) supplied to the three pairs of coils of the stator coil 424 of the brushless motor 42 when receiving an output from the switching matrix circuit 435. In this motor drive circuit 435, by supplying powers in U phase, V phase and W phase to the stator coil 424, the magnet rotor 428 rotates, and then, the yoke 427 which is made integral with the magnet rotor 428, that is, the rotor 426 and the rotational shaft 423 rotate. When the magnet rotor 428 rotates, the Hall elements H1, H2, H3 detect changes in magnetic field and output pulse signals P, which are then inputted into the switching matrix circuit 435, where a switching operation at the output circuit 436 is implemented to the timings of the pulse signals, whereby the rotor 426 is allowed to continue rotating.

According to the configuration as has been described heretofore, with the ignition switch S2 on and also the lighting switch S1 on, as shown in FIG. 1, when information on an angle through which the steering wheel SW of the automobile is steered, the speed of the automobile and the height of the automobile is inputted into the ECU 2 from the sensors 1, the ECU 2 implements an operation at the main CPU 201 based on the sensor outputs which have been inputted into the ECU 2, calculates a left and right direction change angle signal DS of the projector lamp 30 in each of the swivel lamps 3R, 3L of the automobile and outputs the left and right direction change angle signal DS so calculated to the actuator 4 in each of the respective swivel lamps 3R, 3L. In the actuator 4, the sub-CPU 431 implements an operation by the left and right direction change angle signal DS so inputted into the actuator 4 to calculate a signal corresponding to the left and right direction change angle signal DS and then outputs the signal so calculated to the motor drive circuit 434 to thereby rotationally drive the brushless motor 42. Since the rotational driving force of the brushless motor 42 is decelerated by the gear mechanism 44 for transmission to the rotational output shaft 448, the projector lamp 30 connected to the rotational output shaft 448 rotates horizontally, and the direction of the optical axis of the swivel lamp 3R, 3L is changed horizontally. When the projector lamp 30 rotates, the direction change angle of the projector lamp 30 is detected from the rotation angle of the brushless motor 42. Then, the sub-CPU 431 compares the direction change angle detection signal so detected with the left and right direction change angle signal DS inputted from the ECU 2 and feedback controls the rotation angle of the brushless motor 2 in such a manner that the two signals coincide with each other, so that the direction of the optical axis of the projector lamp 30, that is, the direction of the optical axis of the swivel lamp 3R, 3L can be controlled with high accuracy to be situated at a direction change position which is set by the left and right direction change angle signal DS.

Thus, through the direction changing operation on the projector lamps 30, the directions of the axes of beams of light emitted from the both swivel lamps 3R, 3L are changed and the beams of light whose directions are so changed illuminate areas which are horizontally out of the straight-ahead running direction of the automobile, whereby not only the foreground straight-ahead of the moving automobile but also the foreground in a direction in which the automobile is steered can be illuminated, thereby making it possible to enhance the driving safety of the automobile.

Next, operations of the vehicle headlamp apparatus when a defect occurs in the ECU 2 and the actuator 4 will be described below. As to the ECU 2, the main CPU 201 monitors its own operating conditions at all times, and when the ECU 2 detects an abnormality therein, the ECU 2 resets itself by the automatic reset circuit 204, whereby, for example, in the event that an abnormal signal is inputted from the sensors 1 and the actuator 4 to make the main CPU 201 run away, a reset is applied immediately and the ECU 2 can be restored to its normal condition.

Figure 9A:
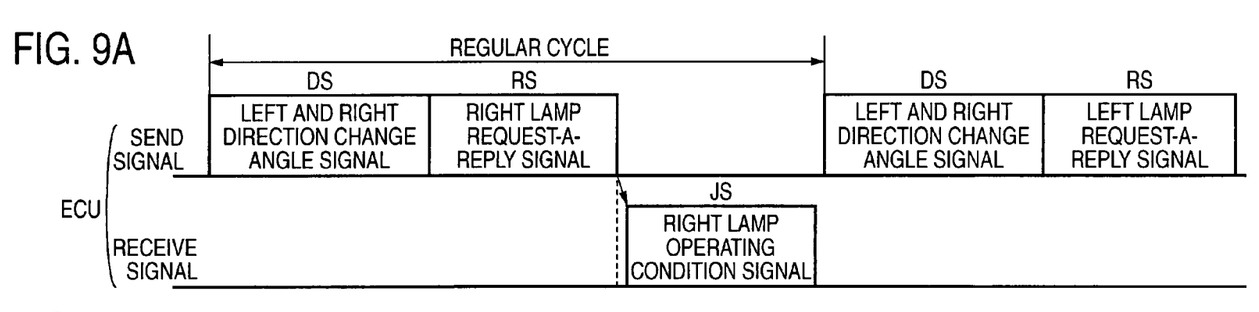
FIGS. 9A to 9C are timing charts of sending and receiving signals to detect an abnormality in the actuator.
Figure 10:
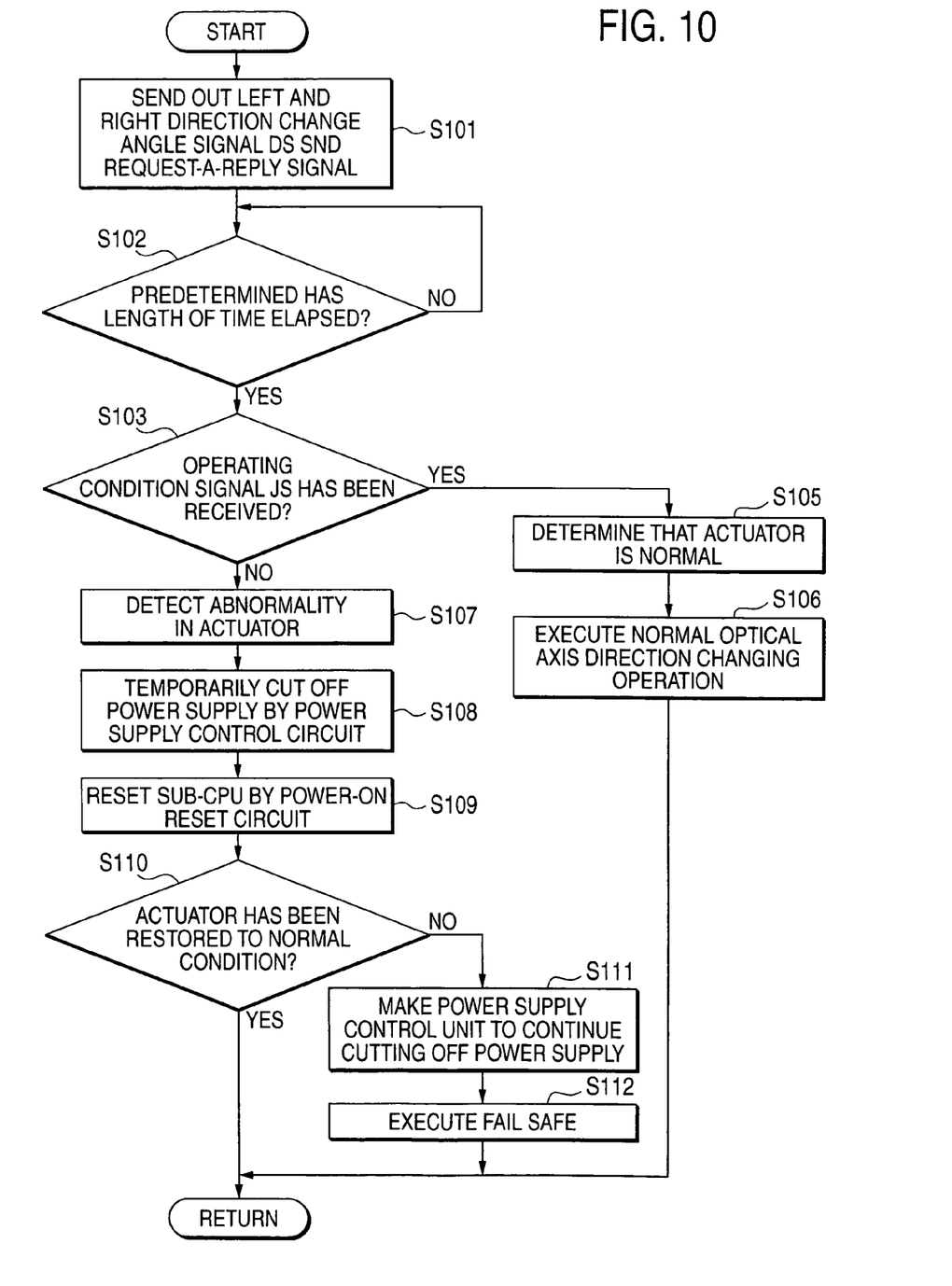
FIG. 10 is a flowchart illustrating operations executed at a normal time and when a first abnormality occurs.

On the other hand, a case where an abnormality occurs in the actuator 4 will be described below. FIG. 9A is a timing chart when signals are sent and received at the normal time. In addition, FIG. 10 is a flowchart illustrating a flow of detecting an abnormality, as well as a flow of operations taken to deal with the abnormality so detected. In these diagrams, the main CPU 201 sends out the left and right direction change angle signal DS to the sub-CPU 431 in each actuator 4 in each swivel lamp 3R, 3L on a predetermined cycle and sends out a request-a-replay signal RS to one and the other actuator alternately. For example, in the same figure, firstly, a reply requesting signal RS is sent to the right swivel lamp 3R in time series (S101). Then, keep queuing for a predetermined length of time and wait until an operating condition signal JS is received from the actuator 4 (S102). When an operating condition signal JS indicating the operating condition of the actuator 4 is sent back from the sub-CPU 431 while queuing, the main CPU 201 receives this operating condition signal JS (S103). The abnormality detecting unit 203 within the main CPU 201 determines that the operating condition of the actuator 4 is normal from the fact that the operating condition signal JS has been received properly (S105), and thereafter, realizes a proper and normal optical axis direction changing operation (S106). Similarly, next, a reply requesting signal RS is sent to the sub-CPU 431 in the left swivel lamp 3L and realizes a proper optical axis direction changing operation when receiving a return of an operating condition signal JS.

Figure 9B:
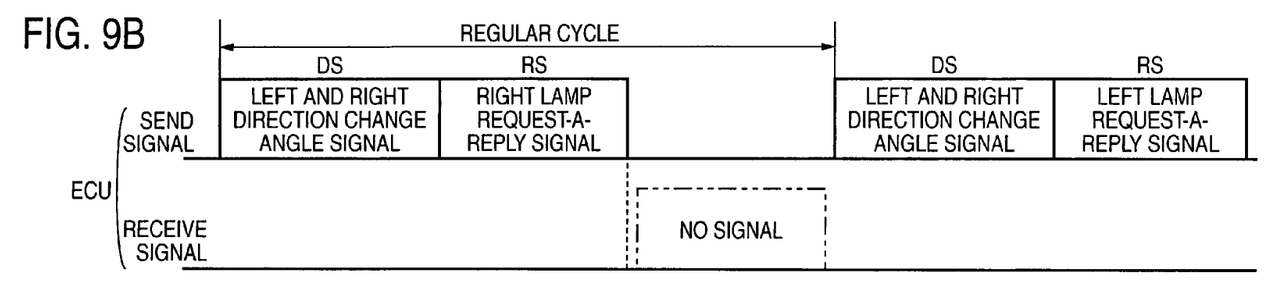

Incidentally, in the event that there occurs a defect in the actuator 4, whereby the sub-CPU 431 is brought to a runaway state, as has been described previously, the proper control of the AFS becomes impossible. In this case, the runaway of the sub-CPU 431 is stopped in the following manner. FIG. 9B is a timing chart of sending and receiving signals when a first abnormality occurs. Referring to the flowchart shown in FIG. 10 again, similarly to when it is normal, the main CPU 201 sends out the left and right direction change angle signal DS to the sub-CPUs 431 of the actuators 4 in the left and right swivel lamps 3R, 3L on the predetermined cycle and also sends out a request-a-reply signal RS to one and the other actuator alternately (S101). In the same figure, the request-a-reply signal RS is first sent to the right swivel lamp 3R in time series. Then, the main CPU 201 queues a predetermined length of time (S102), and if no operating condition signal JS indicating the condition of the actuator 4 is sent back from the sub-CPU 431 while the main CPU 201 is queuing and hence the main CPU 201 can receive no operating condition signal JS (S103), the main CPU 201 then detects that the sub-CPU 431 is running away and hence that the actuator 4 is abnormal (S107). Then, when detecting the abnormality, the main CPU 201 controls the power supply control means 205 to cut off the power supply supplied to the actuator 4 temporarily (S108), whereby the power-on resetting circuit 437 is activated in the actuator 4 in question so as to reset the sub-CPU 431 (S109). The runaway of the sub-CPU 431 is stopped by this reset. The same operation is carried out to the left swivel lamp 3L. Thus, the actuator 4 is brought back to the normal operation by resetting the sub-CPU 431 in that manner, and thereafter, the actuator 4 realizes a proper optical axis direction changing operation by signals DS, RS from the main CPU 201.

In addition, despite the fact that the sub-CPU 431 has been reset by carrying out the runaway stopping operation as has just been described, if the abnormality of the actuator 4 continues to be detected by the abnormality detecting unit 203 of the main CPU 201 (S110), the main CPU 201 determines that the abnormality is not being caused by the runaway of the sub-CPU 431, in which case the power supply control circuit 205 is made to continue cutting off the power supply to the power-on resetting circuit 437 (S111), whereby the sub-CPU 431 is activated in no case, and the optical axis direction changing operation by the actuator 4 is stopped. As this occurs, a fail safe is executed in the actuator 4 in which the optical axis is reset to the initial position (S112), whereby the continuation of the abnormal condition of the AFS can be prevented.

Figure 9C:
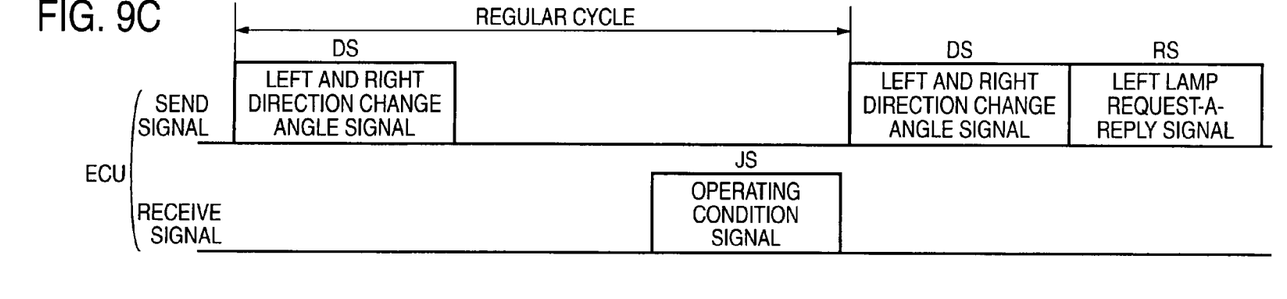

FIG. 9C is a timing chart of sending and receiving signals when a second abnormality occurs. Here, referring to a flowchart shown in FIG. 11, there is described, for example, a case where only a left and right direction change angle signal DS is sent out and no request-a-reply signal RS is sent out. Thus, despite the fact that no request-a-reply signal RS is sent out (S101), in case an operating condition signal JS indicating the condition of the actuator 4 is sent back from the sub-CPU 431 within the predetermined cycle time and the main CPU 201 receives the operating condition signal JS (S102, S104), the main CPU 201 detects that the relevant sub-CPU 431 is running away and hence that the actuator 4 is abnormal (S107). In contrast, if no operating condition signal JS is received, then, the main CPU 201 determines that the actuator 4 is normal, whereby a normal optical axis direction changing operation is carried out (S106). Then, when the main CPU 201 detects an abnormality in the actuator 4, as with the case of the first abnormality, the main CPU 201 controls the power supply control means 205 to cut off the power supply being supplied to the actuator 4 temporarily (s108), whereby the power-on resetting circuit 437 is activated in the actuator 4 in question to thereby reset the sub-CPU 431 (S109). The sub-CPU 431 is prevented from running away by this reset. By resetting the sub-CPU 431 like this, the actuator 4 is brought back to the normal operation, and thereafter, the actuator 4 realizes a normal optical axis direction changing operation by signals DS, RS sent from the main CPU 201.

Figure 11:
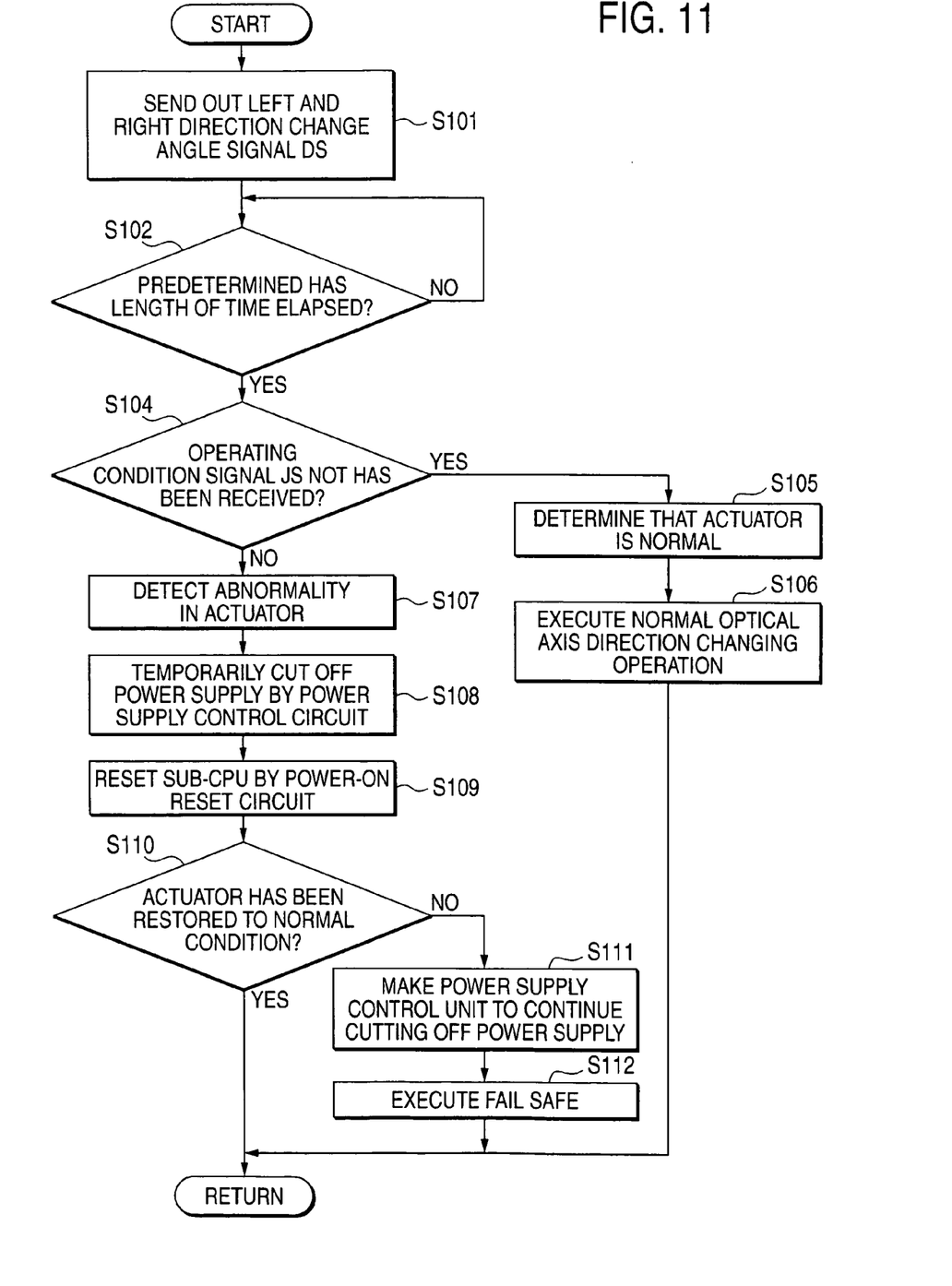
FIG. 11 is a flowchart illustrating operations executed at a normal time and when a second abnormality occurs.

Note that also in the case of the second abnormality, if the main CPU 201 continues to detect the abnormality of the actuator 4 despite of the fact that the sub-CPU 431 has been reset (S110), as with the case of the first abnormality, the power supply control circuit 205 is caused to continue cutting off the power supply to the power-on resetting circuit 437 (S111) so that the sub-CPU 431 is not activated, and a fail safe is then executed (S112).

In addition, although not shown, in the case of the second abnormality, for example, if no operating condition signal JS is sent back from the actuator 4 of the right swivel lamp 3R in question but from the actuator 4 of the left swivel lamp 3L despite the fact that the main CPU 201 sends out a request-a-reply signal RS to the actuator 4 of the right swivel lamp 3R, a similar determination is made. That is, in this case, since both the left and right actuators 4 can be determined to be running away, the main CPU 201 may only have to temporarily cut off the power supply to both the left and right actuators 431 to thereby execute power-on resetting operations.

Thus, in the sub-CPU 431 provided in the actuator 4, the sub-control circuit 43 may only have to be configured by installing the power-on resetting circuit 437 of a simple configuration comprising a capacitor and a resistor on the printed circuit board 45, whereby even in the limited space within the actuator 4, an environment can be arranged in which the sub-CPU 431 can be reset. Then, the runaway of the sub-CPU 431 in the actuator 4 is detected by the CPU 201 of the ECU 2, and based on this detection, the power supply to the actuator 4 is temporarily cut off by the power supply control circuit 205 provided in the ECU 2, whereby the runaway of the sub-CPU 431 can be stopped by resetting the sub-CPU 431 in a similar manner to a reset by an automatic resetting circuit. Consequently, a defect in the AFS can be removed as quickly as possible so as to restore the normal condition therein, whereby a safe optical axis direction changing control can be ensured.

Note that while the example has been described in the embodiment in which the invention is applied to the headlamp in which the direction of the projector lamp constituting the swivel lamp is horizontally changed to thereby change the light-emitting optical axis thereof, the invention may be applied to a headlamp configuration in which only a reflector is operated so as to change the direction thereof or a headlamp configuration in which an auxiliary reflector provided independently from a main reflector is operated so as to change the direction thereof to thereby change the substantial illuminating range of the headlamp.

As has been described heretofore, according to the invention, with the power-on resetting circuit of a simple configuration comprising a capacitor and a resistor being provided in the sub-control circuit provided in the actuator, when the main control circuit detects an abnormality in the sub-control circuit, in the event that the power supply to the sub-control circuit is temporarily cut off by the power supply control means, the sub-control circuit can be reset by the power-on resetting circuit, whereby the abnormality triggered by the runaway of the sub-control circuit can be resolved so that the sub-control circuit can be restored to the normal condition. From this configuration, even in the event that there is not too sufficient a space for the actuator, the sub-control circuit can be restored to the normal condition from the abnormal condition by resetting it, thereby making it possible to allow the AFS to get recovered from the defect condition as quickly as possible.

What is claimed is:

1. A vehicle headlamp apparatus comprising:

optical axis direction changing means for changing the direction of a light-emitting optical axis of a headlamp of a vehicle;

a sub-control circuit provided integrally on the headlamp for controlling the optical axis direction changing means; and a main control circuit for sending out to the sub-control circuit a control signal for changing the direction of the optical axis of the headlamp, wherein the sub-control circuit comprises a power-on resetting circuit for implementing a reset by switching on and off a power supply, wherein the main control circuit comprises power supply control means for temporarily cutting off the supply of power to the sub-control circuit when the main control circuit detects an abnormality in the sub-control circuit; and wherein the main control circuit causes the power supply control means to continue to maintain the power supply cut off state when the main control circuit repeatedly detects an abnormality in the sub-control circuit after the power supply control means has been activated.

2. A vehicle headlamp apparatus according to claim 1, wherein the main control circuit sends out a request-a-reply signal to the sub-control circuit and activates the power supply control means when no appropriate reply signal to the request-a-reply signal is sent back from the sub-control circuit.

3. A vehicle headlamp apparatus according to claim 1, wherein the main control circuit activates the power supply control means when a reply signal is sent thereto from the sub-control circuit to which no request-a-reply signal has been sent out therefrom.

4. A vehicle headlamp apparatus according to claim 3, wherein the main control circuit sends out a request-a-reply signal to the sub-control circuit and activates the power supply control means when no appropriate reply signal to the request-a-reply signal is sent back from the sub-control circuit.

5. A vehicle headlamp apparatus according to claim 3, wherein the main control circuit activates the power supply control means when a reply signal is sent thereto from the sub-control circuit to which no request-a-reply signal has been sent out therefrom.

6. A vehicle headlamp apparatus according to claim 3, wherein a fail safe is executed in which the optical axis is reset to an initial position when the power supply is maintained in cut off state.

7. A vehicle headlamp apparatus according to claim 1, wherein the light-emitting optical axis of the headlamp is changed in its direction horizontally according to the steering angle of the steering wheel of the vehicle.

8. A vehicle headlamp apparatus according to claim 1, wherein the optical axis direction changing means and the sub-control circuit are integrally accommodated as a single unit.

* * * * *